US009235722B2

(12) United States Patent
Vyas et al.

(10) Patent No.: US 9,235,722 B2
(45) Date of Patent: Jan. 12, 2016

(54) DOCUMENT SECURITY

(75) Inventors: Ketankumar Vyas, Bangalore Kamataka (IN); Saurav Roy, Bangalore Kamataka (IN); Abhijit Bhattacharya, Bangalore Kamataka (IN)

(73) Assignee: HEWLETT-PACKARD DEVELOPMENT COMPANY, L.P.L, Houston, TX (US)

( * ) Notice: Subject to any disclaimer, the term of this patent is extended or adjusted under 35 U.S.C. 154(b) by 0 days.

(21) Appl. No.: 13/457,948

(22) Filed: Apr. 27, 2012

(65) Prior Publication Data
US 2013/0291122 A1 Oct. 31, 2013

(51) Int. Cl.
G06F 21/10 (2013.01)
G06F 21/31 (2013.01)
G06F 21/62 (2013.01)

(52) U.S. Cl.
CPC ............ G06F 21/6218 (2013.01); G06F 21/10 (2013.01)

(58) Field of Classification Search
CPC ..... G06F 21/10; G06F 12/1425; G06F 21/16; G06T 1/0021
USPC .......... 707/609, 769, 783; 358/1.15; 235/382, 235/494; 382/100; 455/466; 705/51, 26.8; 713/176; 726/3, 30
See application file for complete search history.

(56) References Cited

U.S. PATENT DOCUMENTS 6,664,976 B2 * 12/2003 Lofgren et al. ............... 345/634
7,051,364 B1 * 5/2006 Tackman et al. ................. 726/3
7,443,527 B1 * 10/2008 Shigeeda .................... 358/1.15
2002/0107802 A1 * 8/2002 Philips ............................ 705/51
2002/0111960 A1 8/2002 Irons et al.
2002/0124024 A1 * 9/2002 Patterson et al. ............. 707/517
2002/0128935 A1 * 9/2002 White et al. .................... 705/27
2003/0195852 A1 * 10/2003 Campbell et al. ............... 705/51
2003/0200234 A1 * 10/2003 Koppich et al. ............... 707/203
2004/0001606 A1 * 1/2004 Levy ............................. 382/100
2004/0225894 A1 * 11/2004 Colvin .......................... 713/200
2005/0171914 A1 * 8/2005 Saitoh ............................ 705/51

(Continued)

FOREIGN PATENT DOCUMENTS

JP 2011204068 10/2011
KR 20090024336 A 3/2009

OTHER PUBLICATIONS

"Preventing Document Leaks with Enterprise Digital Rights Management"; Ricoh White Paper: Ricoh Americas Corporation: 13 pages.

(Continued)

*Primary Examiner* — Peter Poltorak
*Assistant Examiner* — Huan V Doan
(74) *Attorney, Agent, or Firm* — Fabian Van Cott

(57) ABSTRACT

In one embodiment, a document is marked with an identifier and stored in a memory. Responsive to a request received from a user to perform an operation upon the document or a copy of the document at a requester computer, a database is accessed. The database is a database associating users authorized to access the documents or copies of the documents with operations the users are authorized to perform is accessed. Operation authorization is determined at least in part according to a document threat index. Upon determining the user is an authorized user and determining via the database the requested operation is an authorized operation, an access code is sent to the requester computer to enable the operation.

15 Claims, 5 Drawing Sheets

(56) References Cited

U.S. PATENT DOCUMENTS

| | | | |
|---|---|---|---|
| 2005/0276520 A1* | 12/2005 | Leslie et al. | 382/306 |
| 2006/0087942 A1* | 4/2006 | Ahuja | 369/47.12 |
| 2007/0019244 A1 | 1/2007 | Rekiere | |
| 2007/0041628 A1 | 2/2007 | Fan | |
| 2007/0100837 A1 | 5/2007 | Martin | |
| 2007/0115497 A1 | 5/2007 | Cowburn | |
| 2007/0170250 A1* | 7/2007 | Bystrom et al. | 235/382 |
| 2007/0220266 A1* | 9/2007 | Cooper et al. | 713/176 |
| 2008/0062453 A1* | 3/2008 | Bostick et al. | 358/1.15 |
| 2008/0163364 A1* | 7/2008 | Ferlitsch | 726/21 |
| 2009/0064275 A1 | 3/2009 | Eguchi et al. | |
| 2009/0325615 A1* | 12/2009 | McKay et al. | 455/466 |
| 2010/0007907 A1 | 1/2010 | Aikens et al. | |
| 2010/0037061 A1* | 2/2010 | Stefik et al. | 713/176 |
| 2010/0100524 A1* | 4/2010 | Bae et al. | 707/609 |
| 2010/0162347 A1* | 6/2010 | Barile | 726/1 |
| 2011/0184580 A1* | 7/2011 | Kawamoto et al. | 700/295 |
| 2011/0197166 A1 | 8/2011 | Girgensohn et al. | |
| 2011/0293135 A1 | 12/2011 | Irons et al. | |

OTHER PUBLICATIONS

Langham, M.; "Sealed Media Extends Document Security Beyond the Firewall"; Feb. 20, 2004; 2 pages.

Hewlett-Packard Development Company, L.P., "HP Access Control Secure Pull Printing," Nov. 2008, <http://h71028.www7.hp.com/enterprise/downloads/HP-Access-Control-Secure-Pull-Printing.pdf>.

Cortado AG, "Personal Printing now with touch-free Near Field Communication (NFC) support for Android and BlackBerry," Oct. 11, 2011, <http://www.cortado.com/euen/TopMenu/ArticleDetails/tabid/633/articleType/ArticleView/articleId/481/Default.aspx>.

Equitrac Corp., "Equitrac Follow-You Printing(R)," 2010, <http://www.equitrac.com/downloads/Follow-You-Printing-Fleet-Management-Web-based-Solutions.pdf>.

Hewlett-Packard Development Company, L.P., "HP Access Control Secure Authentication—Pin Code," Nov. 2008, <http://h20338.www2.hp.com/enterprise/downloads/HP-Access-Control-Pin-Authentication.pdf>.

* cited by examiner

FIG. 3A

| Association Database | | |
|---|---|---|
| Authorized Users | Authorized Operations if Threat Index is less than or equal to "100" | Authorized Operations if Threat Index is greater than 100" |
| John Smith (administrator) | Create, Read, Update, Delete, Copy, Discard | Create, Read, Update, Delete, Copy, Discard |
| Jean Davis | Copy, Discard | Read |
| Jane Jones | Copy, Discard | Read |
| Bill Williams | Read | Read |

FIG. 3B

| Counters | | | Threat Index |
|---|---|---|---|
| Unauthorized Access Attempts | Hard Copies in Circulation | Soft Copies in Circulation | |
| 1 | 5 | 10 | Threat Index "20" |

FIG. 3C

| | | | Threat Index |
|---|---|---|---|
| Unauthorized Access Attempts | Hard Copies in Circulation | Soft Copies in Circulation | |
| 6 | 20 | 100 | Threat Index "150" |

DOCUMENT SECURITY

BACKGROUND

Security for hard copies and soft copies of a document during the document's lifecycle can be a matter of extreme importance to businesses and other organizations. A compromise or breach of security can have serious consequences for the organization, potentially including loss of a valuable trade secret and associated competitive advantage.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

FIG. 3A depicts an example association database, according to various embodiments.

FIGS. 3B and 3C depict examples of document threat indices, according to various embodiments.

The same part numbers designate the same or similar parts throughout the figures.

DETAILED DESCRIPTION OF EMBODIMENTS

Figure 1:
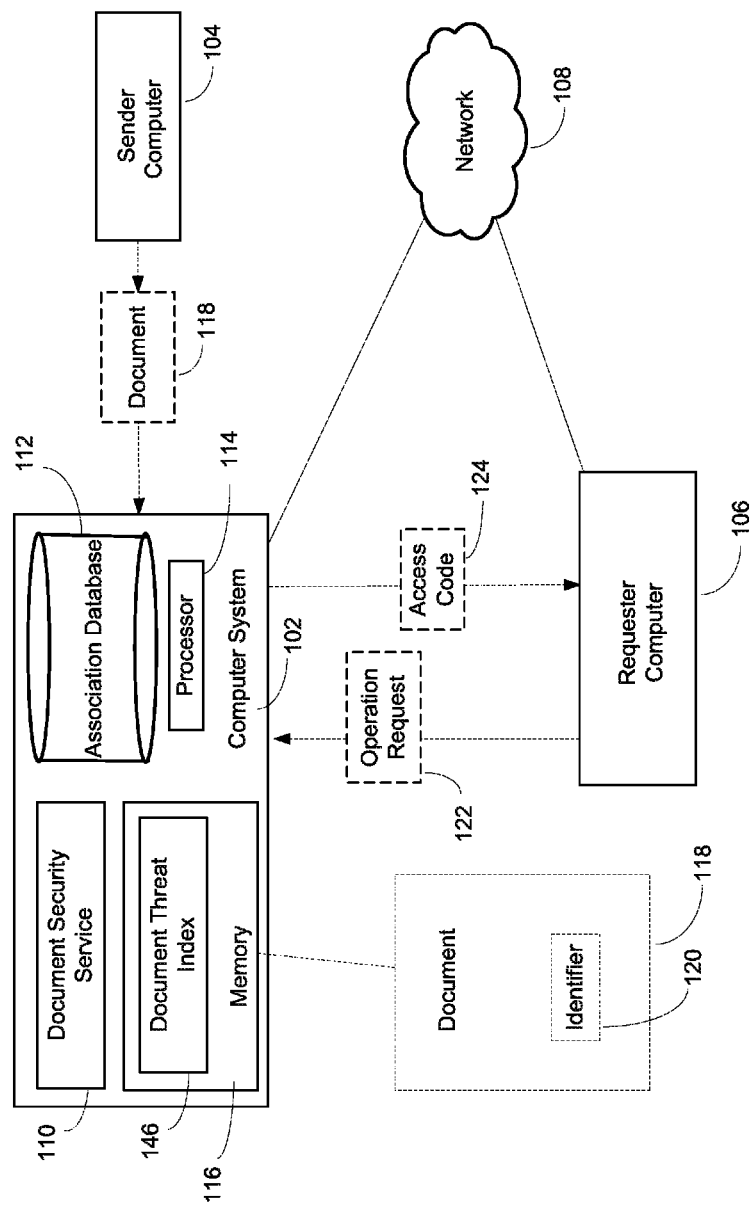
FIG. 1 is a block diagram illustrating a system according to various embodiments.

An automated document management system can provide considerable protection for an organization's confidential information. Document management systems typically attempt to control the dissemination of soft copies and/or the printing of hard copies of a document identified as confidential by requiring a user to provide a personal identification number ("PIN") or password as a security measure. For example, a user may be required to provide a PIN or a password prior to sending a copy to another user via an email, or prior to downloading the soft copy document to a memory device. Similarly, a user may be required to provide a PIN or a password prior to printing a hard copy of a secured document.

However, existing document management systems typically do not consider the life cycle of the confidential document and operate according to a static set of rules and procedures. Security measures and rules for existing document management systems are typically created by an administrative user in accordance with that administrative user's understanding of the level of confidentially associated with the document. Given the ease and speed with which confidential documents can be created, copied, distributed and destroyed today, it will be appreciated to employ a document security method and system that considers of the history of the document after its creation and the assignment of the confidentiality rating. It will also be appreciated for such a method and system to provide for dynamic security protection for documents distributed outside the organization.

Accordingly, various embodiments described herein were developed to provide a document security method and system that meets these needs. In an example of the disclosure, a system marks a confidential document with a unique identifier and stores the document in memory. Responsive to a user request to perform an operation upon the stored document or a copy of the document at a requester computer, the system accesses a database that associates users authorized to access the documents or copies of the documents with operations the users are authorized to perform. The operation authorization as indicated by the database is determined at least in part according to a document threat index. Upon determining the user is an authorized user and determining via the database the requested operation is an authorized operation, the system sends an access code to the requester computer to enable the operation. Advantages of the disclosure include that the system provides a complete security solution for organizations' soft and hard copy confidential documents, and adapts to events in the document's lifecycle, including incidences of dissemination, copying, printing, and destruction of copies of the document. Another advantage of the disclosure is that the system provides security protection for documents even when distributed outside the organization.

As used in this application, a "document" refers to a collection of data that provides information or evidence, or that serves as a record. A document may be in hard copy or soft copy form. "Hard copy" refers to a printed version or copy of the document, including but not limited to a version or copy printed upon paper. "Soft copy" refers to an electronic copy of a document, such as an electronic file viewed on a computer's display or transmitted as an e-mail attachment. "Soft copy" and "electronic document" are used synonymously in this application. "Memory" refers to any memory configured to store program instructions and other data, including but not limited to any non-volatile storage medium. Memory may be in the form of, but is not limited to, read-only memory (ROM), flash memory, hard drive memory, or optical disc storage. "Database" refers to any organized collection of data in digital form such that it can be stored in computer memory or a data storage device. A "document threat index" refers to an indicator, sign, gauge, meter, measure, or estimate of a security threat or threats with respect to a document. "Access code" refers to one or more alphanumeric or other characters that are provided in some manner, e.g., by a user or a system, to initiate an event or get the use of something, including, but not limited to, to create, read, update and/or delete a document. A "printer" or "printing device" refers to any liquid inkjet printer, solid toner-based printer, liquid toner-based printer, or any other electronic device that prints." "Printer" or "printing device" includes any multifunctional electronic device that performs a function such as scanning and/or copying in addition to printing.

FIG. 1 shows a computer system 102 electronically connected to a sender computer 104, and a requester computer 106 via a network 108. Computer system 102 represents generally any computing device or group of computing devices configured to send and receive network requests, send and receive data, and/or otherwise communicate with, the sender computer 104 and the requester computer 106. In examples, computer system 102 may be or include a server, desktop computer, notebook computer, mobile device, tablet computer, and/or any other computing device. In an example, computer system 102 may be additionally configured to send printable content in electronic form to, and/or receive printable content in electronic form from the sender computer 104 or the requester computer 106.

Sender computer 104 and requester computer 106 each represent generally any computing device or group of computing devices configured to send and receive network requests, send and receive electronic documents and other data, and otherwise communicate with, computer system 102 over network 108. In an example, either, or both of, sender computer 104 and requester computer 106 may be a printer computing device that is operable to produce a printed print job or printed content.

Network 108 represents generally hardware components and computers interconnected by communications channels that allow sharing of resources and information. Network 108 may include a cable, wireless, fiber optic, or remote connection via a telecommunication link, an infrared link, a radio frequency link, or some combination of these, or any other connectors or systems that provide electronic communication. Network 108 may include, at least in part, an intranet, the internet, or a combination of both. Network 108 may also include intermediate proxies, routers, switches, load balancers, and the like. The paths followed by network 108 between computer system 102, sender computer 104, and requester computer 106 as depicted in FIG. 1 represent the logical communication paths between these devices, not necessarily the physical paths between the devices.

Computer system 102 is shown to include a document security service 110, an association database 112, a processor 114, and a memory 116. Document security service 110 represents generally any combination of hardware and programming configured to provide a document security system that determines authorization for requested user operations in consideration of document threat index. Association database 112 represents generally a database, registry, lookup table or list that associates users authorized to access a document (or a copy of a document) with operations the users are authorized to perform. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

In the example of FIG. 1, the document security service 110 executing at computer system 102 receives an electronic document 118 from sender computer 104. In a particular example, the sending computer 104 is a multifunction printer computing device, and the electronic document 118 is received by the computer system 102 as a result of a scanning of a hard copy of document 118 at the sending computer 104, and the emailing or other communication of the electronic document 118 from the sending computer 104 to the computer system 102.

The document security service 110 causes the document 118 to be marked with a unique identifier 120. A "unique identifier" refers to an identifier that distinguishes the document 118 from other documents managed via the service 110. In an example, the document 118 may be marked with a metadata tag that is readable by a computer, but which will not be visible to a user that views the document in a production mode, or absent a view mode that displays HyperText Markup Language ("HTML") or other markup language coding. In other examples, the marking may be in the form of a text marking, a barcode, or a watermark. In some embodiments such markings are invisible to a user viewing the document with the naked eye when the document is a production mode (e.g. when viewed at a computer monitor or when the document is printed). In other embodiments the markings may be visible to a user viewing the document with the naked eye when the document is a production mode. After causing the document 118 to be marked with the identifier 120, the document security service causes the marked document to be stored in a memory 116.

The document security service 110 receives from the requester computer 106 a user-initiated request 122 to perform an operation upon the document 118 held in memory 116, or upon a soft or hard copy of the document 118. In examples, the operation request 122 may be a request to edit the document 118 stored in memory 116, a request to produce a soft or hard copy of the document 118 at requester computer 106, or a request to destroy (e.g., deletion of a soft copy from a hard drive, or shredding of a hard copy) a copy of the document 118 at the requester computer 106.

In response to receipt of the operation request 122, the document security service 110 accesses the association database 112, which includes data associating users that are authorized to access documents and copies of the documents with a listing of operations that the authorized users are permitted or authorized to perform. Such operation authorization as detailed by the association database 112 is determined at least in part according to a document threat index 146 that provides information regarding a then-current threat level, height, stage, ranking, or quantity applicable to the document 118. In the example of FIG. 1, the document threat index 146 is stored in the memory 116 within the computer system 102. In other examples, the document threat index may be maintained, held, or stored at a memory located separate from the computer system 102. In an example, a document threat index may be expressed as a number giving the magnitude of a threat in terms of a standard. In another example, a document threat index may be a non-numerical expression or information regarding a threat state or condition. In an example, the document threat index 146 is an index calculated in consideration of a count of unauthorized attempts by users or systems to access the document or a copy of the document. In another example, the document threat index 146 is an index calculated in consideration of a count of copies of the document in circulation. In another example, the document threat index 146 is an index calculated in consideration of a count of hard copies of the document in circulation, and a count of soft copies of the document in circulation.

In an example, the document security service 110, after determining, via accessing the association database 112, that the user that is requesting the document operation is an authorized user and that the requested operation detailed in the operation request 122 is an authorized operation, sends an access code 124 to the requester computer 106 to enable the requested operation.

In another example, the document security service 110 determines that the user that is requesting the document operation is an authorized user by accessing a user directory or other user authorization service, e.g., via a Lightweight Directory Access Protocol ("LDAP") or other network protocol. Such authorization service may be and addition to, in lieu of, confirming user authorization via the association database 112. The document security service 110 then determines that the requested operation detailed in the operation request 122 is an authorized operation via accessing the association database 112, and sends an access code 124 to the requester computer 106 to enable the requested operation.

Following the document security service's 110 determination that the user is an authorized user and that the user-requested operation is an authorized operation, the user at the requester computer 106 may then proceed with the authorized operation. In examples, the authorized operation may be to read, copy, edit, destroy, or perform another operation upon the document 118 or a copy of the document 118. In examples, the document security service 110 requires that each authorized operation be conducted in a manner such that the unique identifier 120 appears on all hard and/or soft copies of the document 118 produced or edited via an authorized operation.

The computer system's 102 receipt of the operation request 122 from the requester computer 106, and/or the computer system's 102 sending of the access code 124 to the requester computer 106, may be via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

The functions and operations described with respect to document security service 110 and computer system 102 may be implemented as a non-transitory computer-readable storage medium containing instructions executed by a processor (e.g., processor 114) and stored in a memory (e.g., memory 116). In a given implementation, processor 114 may represent multiple processors, and memory 116 may represent multiple memories. Processor 114 represents generally any instruction execution system, such as a computer/processor based system or an ASIC (Application Specific Integrated Circuit), a computer, or other system that can fetch or obtain instructions or logic stored in memory 116 and execute the instructions or logic contained therein. Memory 116 represents generally any memory configured to store program instructions and other data.

Figure 2:
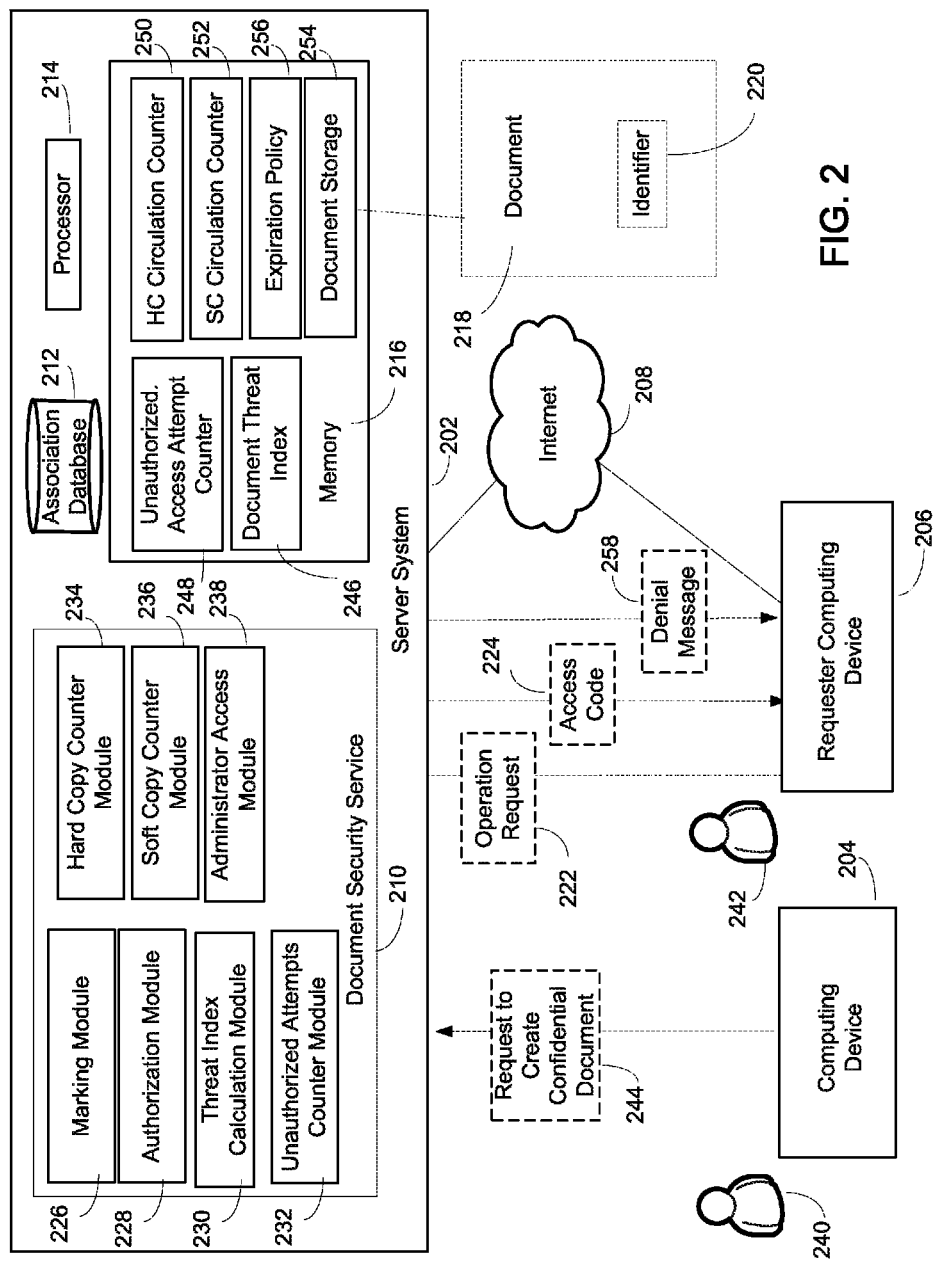
FIG. 2 is a block diagram illustrating a system according to various embodiments.

FIG. 2 is a block diagram illustrating a system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a server system 202 electronically connected to a computing device 204, and a requester computing device 206 via an internet 208. Server system 202 represents generally any computing device or group of computing devices configured to send and receive network requests, send and receive data, and/or otherwise communicate with, the computing device 204 and the requester computing device 206. In examples, the server system 202 may be or include a server, desktop computer, notebook computer, mobile device, tablet computer, and/or any other computing device. In an example, the server system 202 may be additionally configured to send printable content in electronic form to, and/or receive printable content in electronic form from, the computing device 204 and/or the requester computing device 206.

The computing device 204 represents generally a computing device, or group of computing devices, configured to send and receive network requests, send content to, and otherwise communicate with, the server system 202.

In this example, the requester computing device 206 represents generally a multifunction printer computing device that is operable to produce a printed print job or printed content, and additionally operable to send network requests, print jobs and other content to, receive network requests, print jobs, and other content from, and otherwise communicate with server system 202 over internet 208. In this example, the requester computing device 206 is additionally operable to receive a hard copy of a document and create additional hard copies thereof (a copy function), create soft copies thereof (a scan function), save a soft copy to a local or external memory (a file save function), and transmit soft copies of the document to other computing devices (an email or file transfer function). In other examples, the requester computing device 206 may be device that is configured to perform less than all of the operations listed above in this paragraph, or may be a computing device configured to perform different document operations.

Internet 208 represents generally hardware components and computers interconnected by communications channels that allow sharing of resources and information over an internet or intranet network, or over a combination of both. Internet 208 may include a cable, wireless, fiber optic, or remote connection via a telecommunication link, an infrared link, a radio frequency link, or some combination of these, or any other connectors or systems that provide electronic communication. Internet 208 may also include intermediate proxies, routers, switches, load balancers, and the like. The paths followed by internet 208 between server system 202, computing device 204, and requester computing device 206 as depicted in FIG. 2 represent the logical communication paths between these devices, not necessarily the physical paths between the devices.

Server system 202 is shown to include a document security service 210, an association database 212, a processor 214, and a memory 216. Document security service 210 represents generally any combination of hardware and programming configured to provide for document security by determining authorization for user requests to perform document operations in light of a document threat index. The service 210 includes a marking module 226, an authorization module 228, a threat index calculation module 230, an unauthorized attempts counter module 232, a hard copy counter module 234, a soft copy counter module 236, and an administrator access module 238.

The association database 212 represents generally a database, registry, lookup table or list that associates users authorized to access a document (or a copy of a document) with sets of operations the authorized users may perform. Processor 214 represents generally any instruction execution system, such as a computer/processor based system or an ASIC (Application Specific Integrated Circuit), a computer, or other system that can fetch or obtain instructions or logic stored in memory 216 and execute the instructions or logic contained therein. Memory 216 represents generally any memory configured to store program instructions and other data.

In the example of FIG. 2, server system 202 receives from a user 240 via the computing device 204 request 244 to create a confidential document in electronic form at server system 202. In an example, the request 244 may be to create the confidential document in accordance with a template that is stored in memory 216 at server system 202. In another example, the request 244 may be to create the confidential document at server system 202 via a web browser or other application executing at the computing device 204. In response to the request 244 to create a document, the document security service 210 creates a confidential document 218, and the marking module 226 causes the document 218 to be marked with a unique identifier 220 and stored in a document storage component 254 of the memory 216. In the example of FIG. 2, the memory 216 included within the server system 202. In another example, the document may be stored in a memory that is separate from the server system 202, but accessible to the server system 202 via the internet 208.

The authorization module 228, receives, from a user 242 via the requester computing device 206, an operation request 222 to perform an operation at the device 206 upon the document 218 or a copy of the document. In an example, the request is a request to read, edit, copy, email, file transfer, or delete the electronic document 218 stored in memory 216 at the server system 202. In another example, the request is a request to read, edit, copy, email, file transfer, or delete a soft copy of the document 218 that is stored in a memory at the requester computing device 206, or at a removable memory device that is connected to requester computing device 206. In another example, the request is a request to scan, copy, email, file transfer, or shred a hard copy of the document 218 that is present at the requester computing device 206.

In response to receipt of the request, the authorization module 228 accesses the association database 212, which contains data associating users authorized to access the documents or copies of the documents with operations the users are authorized to perform. The operation authorization as indicated by the database 212 is determined at least in part according to a document threat index 246 that takes into account unauthorized attempts by a user to access the document or a copy of the document. In this example, the document threat index also takes and counts of hard copies and soft copies of the document in circulation.

FIG. 3A, in view of FIG. 2, depicts an example of an association database 212 according to various embodiments. In this example, the association database associates authorized users 302 with authorized operations 304 306 available to the authorized users 302. In this example, a certain authorized operations 304 are available to the authorized users 352 if the document threat index 246 is less than or equal to "one hundred." In this example, other authorized operations 306 are available to the authorized users 352 if the document threat index 246 is greater than "one hundred." In this manner the number of operations available to certain authorized users, such as users "Jean Davis" 308, "Jane Jones" 310, and "Bill Williams" 312, is adjusted downward in the event it is determined, via the document threat index 246, that a security threat of a predefined magnitude exists with respect to the document. In the example of FIG. 3A, an authorized user with administrator rights, e.g., "John Smith" 314, enjoys the same authorized operation rights regardless of whether the document threat index 246 is greater than "one hundred."

Returning to the example of FIG. 2, threat index calculation module 230 calculates the document threat index 246. In this example, the threat index calculation module 230 calculates the document threat index 246 in part utilizing a count of unauthorized attempts by users or systems to access the document 218 at the server system 202, or a hard or soft copy of the document at requester computing device 206 or any other computing device connected to server system 202 via internet 208. In this example, unauthorized attempts counter module 232 increments an unauthorized access attempt counter 248 as the module 232 receives information of an attempt by an unauthorized user to copy or destroy the document 218 or a copy of the document.

In the example of FIG. 2, the threat index calculation module 230 also takes into account a count of hard copies of the document in existence in calculating the document threat index 246. A hard copy counter module 234 maintains a hard copy circulation counter 250 that is incremented responsive to receipt of data indicative of a photocopying or printing of a hard copy of the document 218. The hard copy counter 250 is likewise decremented responsive to its receipt of data indicative of a disposal or shredding of a hard copy of the document 218. In this example, the threat index calculation module 230, responsive receipt of information that the hard copy counter 250 has increased or decreased, adjusts the document threat index 246 to reflect changes in the counter 250.

In the example of FIG. 2, the threat index calculation module 230 also takes into account a count of soft copies of the document in existence in calculating the document threat index 246. A soft copy counter module 236 maintains a soft copy circulation counter 252 that is incremented responsive to receipt of data indicative of a electronic copying of an existing soft copy, a creation of a soft copy from a hard copy, or an electronic distribution of a soft copy of the document 218. The soft copy counter 252 is likewise decremented responsive to its receipt of data indicative of deletion of a soft copy of the document 218. In this example, the threat index calculation module 230, responsive receipt of information that the soft copy counter 252 has increased or decreased, adjusts the document threat index 246 to reflect changes in the counter 252.

FIGS. 3B and 3C, in view of FIG. 2, provide examples of a calculation or updating of a document threat index 246. In the example of FIG. 3B, the threat index calculation module 230 calculates the document threat index 246 in part utilizing a count of "one" unauthorized attempt 316 by a user or system to access the document 218 or a copy of the document. The one unauthorized attempt count 316 is a value obtained from the unauthorized access attempt counter 248. The threat index calculation module 230 in calculating the document threat index 246 also utilizes a count of "five" hard copies 318 of the document 218 currently in existence. The count of five hard copies in circulation 318 is a value obtained from the hard copy circulation counter 250. The threat index calculation module 230 in calculating the document threat index 246 also utilizes a count of "ten" soft copies 320 of the document 218 currently in circulation. The count of ten soft copies in circulation is a value obtained from the soft copy circulation counter 252. In the example of FIG. 3B, the threat index calculation module calculates a threat index of "twenty" 322 by employing the following formula:

$$\text{Threat Index} = (x*5) + y + z.$$

In this example, "x" is the number of unauthorized attempts by users or systems to access the document 218, "y" is the count hard copies of the document 218 currently in existence, and "z is the count of soft copies of the document 218 currently in existence. This particular formula weighs the count of unauthorized access attempt more heavily in comparison to the counts of hard and soft copies of the document in circulation. This is merely an example, however, and various methodologies and formulas may be utilized in other embodiments. Moving to FIG. 3C, again utilizing the formula set forth in this paragraph, a threat index of "one hundred fifty" 330 is derived where the input is a count of "six" unauthorized access attempts 324, a count of "twenty" hard copies in circulation 326, and a count of "one hundred" soft copies in circulation 328.

In an example, the document security service 210 additionally includes an administrator access module 238, configured to enable an administrative user to edit the association database 212 to define access permissions and privileges for users specific to the document 218. In an example, the administrator access module 238 enables the administrative user to define or edit an access expiration policy 256 for the document, such that upon the reaching of a date or milestone, some or all users are denied the ability to perform, read, copy, edit, delete, and/or other operations upon the document 218 or a copy of the document 218. In an example the expiration policy 256 may be a policy with respect a particular type of copy of the document 218, e.g. a "soft copy expiration policy", and not affect requests for hard copy operations. In another example, the expiration policy 256 may be an expiration policy that restricts both hard and soft copy operations.

The authorization module 228, after determining, via accessing the database 212, that the user 242 that is requesting the document operation is an authorized user and that the requested operation detailed in the operation request 222 is an authorized operation, sends an access code 224 to the requester computer 206 to enable the operation. The user 242 at requester computer may then proceed with the reading, copying, editing, destroying, or other operation that the user 242 requested for the document 218, and that the document authorization module 228 determines is authorized for such user's interaction with the document 218.

On the other hand, if the authorization module 228 determines that the user 242 that is requesting the document operation is an unauthorized user, or determines via the association database 212 that the requested operation 222 is an unauthorized operation, the module 228 causes a denial message 258 to be sent to the multifunction computer 206 for display to a user, to communicate the requested operation 258 is denied or prohibited.

The server system's 202 receipt of the operation request 222 from the computing device 204, and/or the server system's 202 sending of the access code 224 or denial message 258 to the requester computing device 206 may be via a networking protocol, including but not limited to TCP/IP, HTTP, SMTP, XMPP, and/or SIP.

Figure 4:
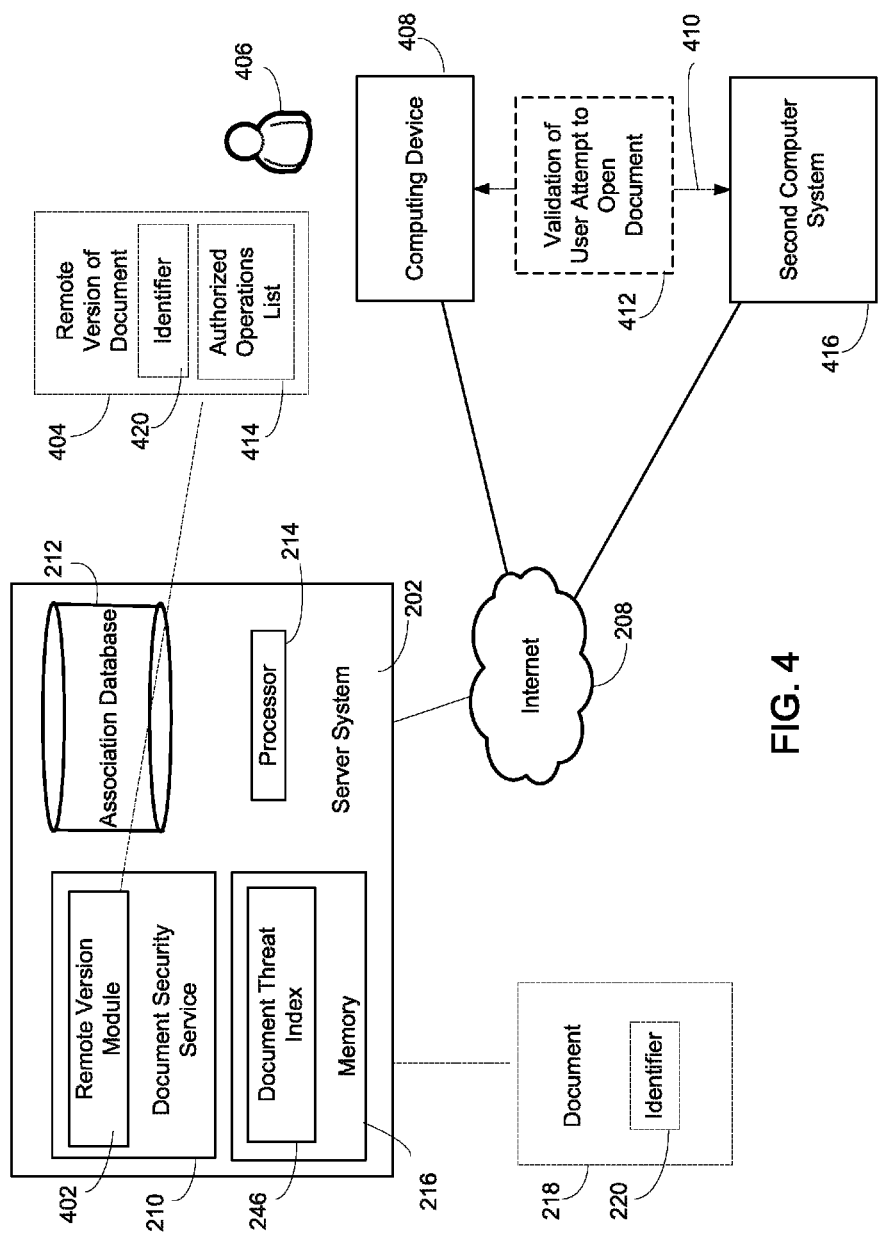
FIG. 4 is a block diagram illustrating a system according to various embodiments.

FIG. 4 illustrates the server system 202 of FIG. 2, wherein the document security service 210 additionally includes a remote version module 402. In the example, of FIG. 4, the remote version module 402 creates a remote version 404 of the document 218 that is accessible to be opened or unlocked by an authorized user 406 at another computing device 408 that is in electronic connection 410 to a second computer system 416 that is separate and distinct from the server system. In an example, the second computer system 416 hosts an email service or social networking service.

In an example, the remote version module 402 sends the remote version 404 to the computing device 408. Validation 412 of an attempt by the user 406 to open the remote version 404 at the computing device 408 occurs via an online connection 410 established between the computing device 408 that executes the remote version 404 and the second computer system 416. The authorized user 406 submits to the second system 416, via interaction with the document or a user interface at the computing device 408, authentication information 414 that is recognized by the second system 416.

In one embodiment, validation 412 of the user's 406 authorization to access the remote version 404 of the document via the remote version module 402 is available when the computing device 408 is not in electronic connection with the server system 202. In another embodiment, validation 412 of the user's 406 authorization to access the remote version 404 of the document via the remote version module 402 is available even when the computing device 408 in electronic connection with the server system 202. In the latter example, the user 406 or a system may choose to validate the user 406 as authorized via the authorization module 228 and an electronic connection with the server system 202. Alternatively, in the latter example the user 406 or a system may choose to validate 412 the user 406 as authorized via the remote version module 402 and the electronic connection 410 between the computing device 408 and the second computer system 416.

In an example, the remote version 404 includes a document identifier 420 that identifies the remote version 404 as a remote copy of the document 218 that is stored in memory 216 at the server system 202. In another example, the remote version 404 includes a list of operations 414 that are authorized for that user 406, and the remote version 404 restricts the user 406 to the listed operations.

The functions and operations described with respect to the document security service 210 and server system 202 may be implemented as a non-transitory computer-readable storage medium containing instructions executed by a processor (e.g., processor 214) and stored in a memory (e.g., memory 216). In a given implementation, processor 214 may represent multiple processors, and memory 216 may represent multiple memories. Processor 214 represents generally any instruction execution system, such as a computer/processor based system or an ASIC (Application Specific Integrated Circuit), a computer, or other system that can fetch or obtain instructions or logic stored in memory 216 and execute the instructions or logic contained therein. Memory 216 represents generally any memory configured to store program instructions and other data.

Figure 5:
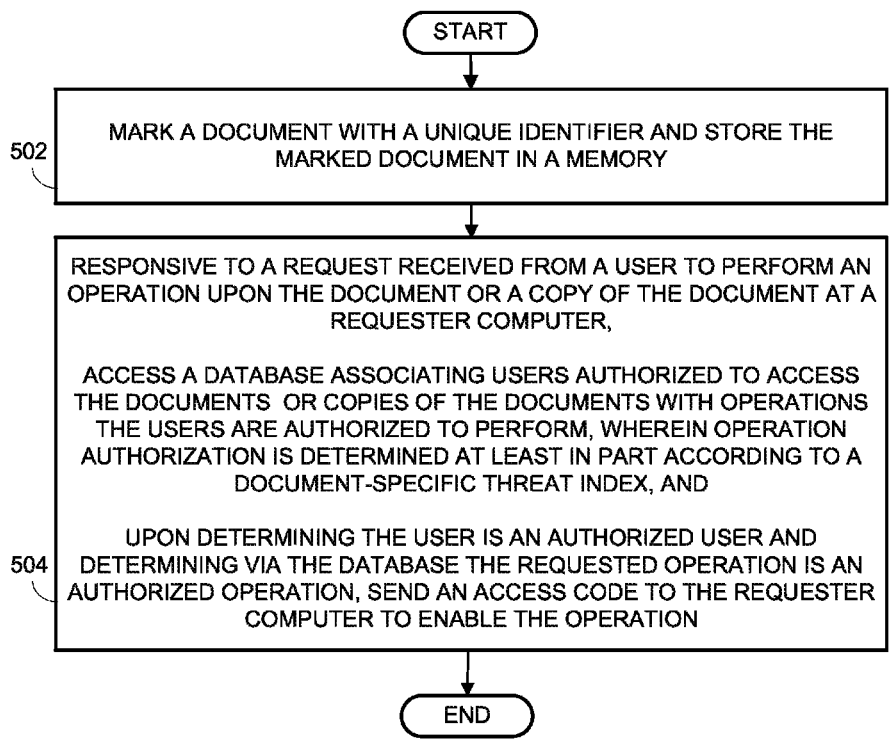
FIG. 5 is a flow diagram depicting steps taken to implement various embodiments.

FIG. 5 is a flow diagram of operation in a system according to various embodiments. In discussing FIG. 5, reference may be made to the diagram of FIG. 2 to provide contextual examples. Implementation, however, is not limited to those examples. Starting with FIG. 5, a document is marked with a unique identifier and stored in a memory (block 502). Referring back to FIG. 2, the marking module 226 may be responsible for implementing block 502.

Continuing with FIG. 5, responsive to a request received from a user to perform an operation upon the document or a copy of the document at a requester computer, a database associating users authorized to access the documents or copies of the documents with operations the users are authorized to perform is accessed. Operation authorization according to the database is determined at least in part according to a document threat index. Upon determination that the user is an authorized user and determination via the database the requested operation is an authorized operation, an access code is sent to the requester computer to enable the operation (block 504). Referring back to FIG. 2, the authorization module 228 may be responsible for implementing block 504.

Various modifications may be made to the disclosed embodiments and implementations without departing from their scope. Therefore, the illustrations and examples herein should be construed in an illustrative, and not a restrictive, sense.

What is claimed is:

1. A non-transitory computer-readable storage medium containing instructions, the instructions when executed by a processor causing the processor to:
   mark a document with an identifier and store the marked document in a memory;
   responsive to a request received from a user to perform an operation upon the document or a copy of the document at a requester computer,
   access a database associating users authorized to access the documents or copies of the documents with operations the users are authorized to perform, wherein operation authorization is determined at least in part according to a document threat index; and
   upon determining the user is an authorized user and determining via the database the requested operation is an authorized operation, send an access code to the requester computer to enable the operation;
   wherein a current level of the document threat index is calculated based on all of: a number of unauthorized attempts by users to access a copy of the corresponding document, a count of soft copies of the document, and a count of hard copies of the document;
wherein the processor causes a hard copy circulation counter to be decremented responsive to receipt of data indicative of a disposal or shredding of a hard copy of the document, and the document threat index is adjusted to reflect changes in the hard copy circulation counter.

2. The medium of claim 1, wherein the instructions cause to the processor to mark all copies of the document, both hard and soft copies, with the identifier.

3. The medium of claim 2, wherein the instructions cause to the processor to authorize or deny requested operations on both soft and hard copies of the document using the document identifier to determine, by accessing the database, whether a requesting user is authorized for a requested operation on a corresponding document.

4. The medium of claim 1, wherein the instructions cause the processor to change which operations that authorized users are permitted to perform, as recorded in the database, based on a current value of the document threat index.

5. The medium of claim 1, wherein the identifier is invisible to the human eye when viewing either of a computer displayed or printed version of the document.

6. The medium of claim 1, wherein the calculation of the document threat index weights the number of unauthorized attempts to access the document more heavily than the count of copies of the document.

7. The medium of claim 5, wherein the processor causes the hard copy circulation counter to be incremented responsive to receipt of data indicative of a photocopying or printing of a hard copy of the document, and the document threat index is adjusted to reflect changes in the hard copy circulation counter.

8. The medium of claim 5, wherein the processor causes a soft copy circulation counter to be incremented responsive to receipt of data indicative of an electronic copying of an existing soft copy, a creation of a soft copy from a hard copy, or an electronic distribution of a soft copy of the document, and the document threat index is adjusted to reflect changes in the soft copy circulation counter.

9. The medium of claim 8, wherein the processor causes the soft copy circulation counter to be decremented responsive to receipt of data indicative of deletion of a soft copy of the document, and the document threat index is adjusted to reflect changes in the soft copy circulation counter.

10. The medium of claim 1,
wherein the marking, storing, accessing, determining, and sending steps are steps conducted by a first computer system;
wherein the instructions cause the processor to create a remote version of the document accessible to be opened or unlocked by an authorized user at a computing device with electronic connection to a second computer system;
wherein validation of the user attempting to open the remote version occurs via an online connection between a computer executing the remote version and the second system, with the user entering authentication information recognized by the second system; and
wherein the remote version includes a list of operations authorized for the user and restricts the user to the listed operations.

11. The medium of claim 10, wherein the remote version is additionally operable to be opened via the first system when the computing device is electronically connected to the first system.

12. A system to provide a document security service, comprising a memory and a processor to execute instructions stored in the memory to implement modules, the modules comprising:
a marking module, configured to mark a document with a unique identifier, wherein the system subsequently marks both hard and soft copies of that document with that unique identifier;
an authorization module, configured to, responsive to a request from a user to perform an operation upon the document or a hard or soft copy of the document,
access a database associating users authorized to access the documents or copies of the documents with operations the users are authorized to perform, wherein operation authorization is determined at least in part according to a document threat index, wherein a current level of the document threat index is calculated based on all of: a number of unauthorized attempts by users to access a copy of the corresponding document, a count of soft copies of the document, and a count of hard copies of the document; and
upon determining the user is an authorized user and determining via the database the requested operation is an authorized operation, send an access code to enable the operation;
wherein the processor causes a hard copy circulation counter to be incremented responsive to receipt of data indicative of a photocopying or printing of a hard copy of the document, and the document threat index is adjusted to reflect changes in the hard copy circulation counter;
wherein the processor causes the hard copy circulation counter to be decremented responsive to receipt of data indicative of a disposal or shredding of a hard copy of the document, and the document threat index is adjusted to reflect changes in the hard copy circulation counter.

13. The system of claim 12, further comprising a soft copy counter module, configured to cause a soft copy circulation counter to be incremented responsive to receipt of data indicative of an electronic copying of an existing soft copy, a creation of a soft copy from a hard copy, or an electronic distribution of a soft copy of the document, and the counter to be decremented responsive to receipt of data indicative of deletion of a soft copy of the document, and the document threat index is adjusted to reflect changes in the counter.

14. The system of claim 12, wherein operations that an authorized user is authorized to perform in said database are changed based on a current level of said document threat index.

15. A method to provide a document security service, the method comprising:
identifying a document with a unique identifier;
responsive to a request from a user to perform an operation upon the document or a copy of the document,
accessing a database associating users authorized to access documents or copies of the documents with operations the users are authorized to perform upon the documents, wherein operation authorization granted to a particular user with respect to a particular document will change in said database based at least in part on a current value of a document threat index, such that a particular user will lose authorization to perform a particular action on a particular document if the current value of the document threat index for that document exceeds a threshold value;

upon determining the user is an authorized user and determining via the database the requested operation is an authorized operation, sending an access code to enable the operation;

upon determining the user is an unauthorized user, or upon determining the user is an authorized user but the requested operation is an unauthorized operation, sending a message to communicate that the requested operation is prohibited; and calculating a current level of the document threat index based on a number of unauthorized attempts by users to access a copy of the corresponding document, a count of soft copies of the document and a count of hard copies of the document;

decrementing a hard copy circulation counter responsive to receipt of data indicative of a disposal or shredding of a hard copy of the document, and the document threat index is adjusted to reflect changes in the hard copy circulation counter.

* * * * *

UNITED STATES PATENT AND TRADEMARK OFFICE
CERTIFICATE OF CORRECTION

PATENT NO.         : 9,235,722 B2
APPLICATION NO.    : 13/457948
DATED              : January 12, 2016
INVENTOR(S)        : Ketankumar Vyas et al.

Page 1 of 1

It is certified that error appears in the above-identified patent and that said Letters Patent is hereby corrected as shown below:

On the Title page, in item (75), Inventors, in column 1, line 2, delete "Kamataka" and insert -- Karnataka --, therefor.

On the Title page, in item (75), Inventors, in column 1, line 3, delete "Kamataka" and insert -- Karnataka --, therefor.

On the Title page, in item (75), Inventors, in column 1, line 4, delete "Kamataka" and insert -- Karnataka --, therefor.

In The Claims

In column 11, line 5, in Claim 1, delete "cony" and insert -- copy --, therefor.

Signed and Sealed this
Twenty-third Day of August, 2016

Michelle K. Lee
*Director of the United States Patent and Trademark Office*